US010703369B2

(12) United States Patent
Hathaway et al.

(10) Patent No.: US 10,703,369 B2
(45) Date of Patent: Jul. 7, 2020

(54) METHOD FOR DISENGAGING HYDRAULIC PARK WITHOUT ENGINE POWER

(71) Applicant: Ford Global Technologies, LLC, Dearborn, MI (US)

(72) Inventors: Richard Hathaway, Livonia, MI (US); Jeffrey James Tumavitch, Livonia, MI (US); Than Pham, Livonia, MI (US); Joseph Scott Slayton, Macomb Township, MI (US); Markian Diakiw, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 134 days.

(21) Appl. No.: 16/107,022

(22) Filed: Aug. 21, 2018

(65) Prior Publication Data
US 2019/0118819 A1    Apr. 25, 2019

Related U.S. Application Data

(60) Provisional application No. 62/575,268, filed on Oct. 20, 2017.

(51) Int. Cl.
*F16H 63/34* (2006.01)
*B60W 30/18* (2012.01)
*B60W 10/196* (2012.01)
*B60W 10/06* (2006.01)
*B60W 10/115* (2012.01)
*B60W 10/30* (2006.01)

(52) U.S. Cl.
CPC ...... *B60W 30/18054* (2013.01); *B60W 10/06* (2013.01); *B60W 10/115* (2013.01); *B60W 10/196* (2013.01); *B60W 10/30* (2013.01); *F16H 63/3433* (2013.01); *F16H 63/3483* (2013.01); *B60W 2540/10* (2013.01); *B60W 2540/12* (2013.01); *B60W 2540/16* (2013.01); *B60W 2710/188* (2013.01)

(58) Field of Classification Search
CPC ............. F16H 63/3433; F16H 63/3483; F16H 63/3416; F16H 63/3425; B60W 2540/10; B60W 2540/12; B60W 2540/16; B60W 2710/188
See application file for complete search history.

(56) References Cited

U.S. PATENT DOCUMENTS

| | | | |
|---|---|---|---|
| 8,667,859 B2* | 3/2014 | Engel | F16H 61/30 74/473.11 |
| 10,562,512 B2* | 2/2020 | Miller | B60W 10/113 |
| 2007/0200428 A1 | 8/2007 | Buglione et al. | |
| 2011/0198190 A1* | 8/2011 | Steinhauser | F16H 63/3491 192/219.5 |
| 2014/0213402 A1 | 7/2014 | Wilton et al. | |
| 2018/0118185 A1* | 5/2018 | Frait | F16D 48/062 |

* cited by examiner

*Primary Examiner* — Sherry L Estremsky
(74) *Attorney, Agent, or Firm* — Vincent Mastrogiacomo; Brooks Kushman P.C.

(57) ABSTRACT

In a special operating mode, a controller is programmed to disengage a hydraulically actuated park mechanism without use of engine power. The starter motor is used to rotate the engine-driven pump at sufficient speed to command disengagement of Park. Once park is disengaged, a holding pin is used to maintain the out of park condition without hydraulic pressure or flow.

19 Claims, 7 Drawing Sheets

METHOD FOR DISENGAGING HYDRAULIC PARK WITHOUT ENGINE POWER

CROSS-REFERENCE TO RELATED APPLICATIONS

This application claims the benefit of U.S. provisional Application No. 62/575,268 filed Oct. 20, 2017, the disclosure of which is incorporated in its entirety by reference herein.

TECHNICAL FIELD

This disclosure relates to the field of hydraulic control systems for automatic transmissions for motor vehicles. More particularly, the disclosure relates to a method of disengaging a hydraulically controlled parking mechanism using a starter motor to drive a transmission pump.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

Discrete ratio transmissions are capable of transmitting power via various power flow paths, each associated with a different speed ratio. A particular power flow path is established by engaging particular shift elements, such as clutches or brakes. Shifting from one gear ratio to another involves changing which shift elements are engaged. In many transmissions, the torque capacity of each shift element is controlled by routing fluid to the shift elements at controlled pressure. A controller adjusts the pressure by sending electrical signals to a valve body.

When a vehicle is parked, the transmission may engage a parking pawl which holds the transmission shaft stationary to prevent the vehicle from rolling. The parking system is designed to remain engaged without consuming any power during extended unattended periods. Normally, the parking pawl is engaged in response to the driver selecting Park and is disengaged in response to the driver selecting any other range, such as Reverse, Neutral, Drive, or Low.

SUMMARY OF THE DISCLOSURE

A vehicle includes an engine, a starter, a transmission, and a controller. The engine has a crankshaft. The starter is configured to rotate the crankshaft. The transmission has a pump driven by the crankshaft and a hydraulically actuated park mechanism. The controller is programmed to, in response to a sequence of driver actions, enable engine cranking, disable engine firing, and issue hydraulic commands, and then, in response to an engine cranking command, activate the starter to release the park mechanism without starting the engine. The sequence of driver action may be, for example, depressing brake and accelerator pedals, selecting neutral, and performing a secondary selection, such as selecting a manual shift mode or selecting a low mode. The vehicle may also include a push button gear shift selector, in which case the secondary selection may be pushing a neutral button a second time. The hydraulic commands may be, for example, commanding a line pressure, and commanding engagement of two shift elements. The controller may be further programmed to, in response to the engine cranking command, turn off a holding solenoid, and in response to release of the park mechanism, turn on the holding solenoid.

A method to release a hydraulically actuated park mechanism includes unlocking a gear shift module, disabling engine firing, enabling engine cranking, activating a starter motor, and issuing hydraulic commands. Unlocking of the gear shift module is performed in response to depression of brake and accelerator pedals. Disabling engine firing and enabling engine cranking is performed in response to selection of neutral followed by a secondary selection. Activating the starter motor and issuing the hydraulic commands is performed in response to a driver initiated cranking command and has the effect of releasing the park mechanism without starting an engine. Examples of secondary selections include pushing a neutral button a second time, selecting a manual shift mode, and selecting a low mode. The hydraulic commands may be commanding a line pressure and commanding engagement of two shift elements. A holding solenoid may be turned off in response to the driver initiated cranking command and then turn in response to release of the park mechanism.

A vehicle includes a starter, a pump, an engine crankshaft, a hydraulically actuated parking mechanism, and a controller. The starter and the pump are both drivably connected to the engine crankshaft. The controller programmed is programmed to unlock a gear shift module, enable engine cranking, disable engine firing, and issue hydraulic commands. The gear shift module is unlocked in response to depression of brake and accelerator pedals. The other controller actions are undertaken in response to selection of neutral and a secondary selection. As a result of these actions, activation of the starter releases the park mechanism without starting an engine. Examples of secondary selections include pushing a neutral button a second time, selecting a manual shift mode, and selecting a low mode. The hydraulic commands may include commanding a line pressure and commanding engagement of two shift elements. The controller may be further programmed to turn off a holding solenoid in response to starter motor activation and turn on the holding solenoid in response to release of the park mechanism.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
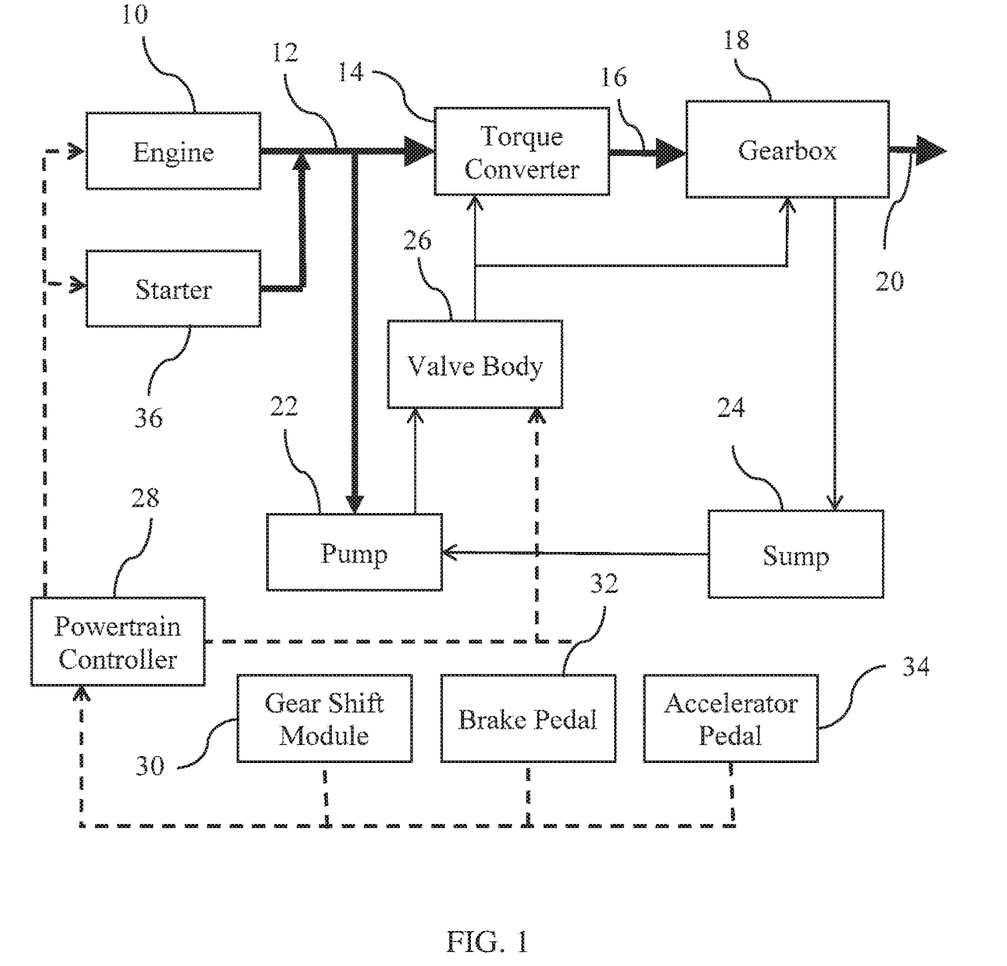
FIG. 1 is a schematic diagram of an automotive powertrain.

FIG. 1 schematically illustrates a vehicle powertrain. Bold solid lines represent mechanical power flow connections. Thin solid lines represent the flow of hydraulic fluid. Dashed lines represent the flow of information signals. Propulsive power is supplied by internal combustion engine 10 at transmission input shaft 12. Fluid coupling 14 includes an impeller drivably connected to input shaft 12 and a turbine drivably connected to turbine shaft 16. Power is transmitted from the impeller to the turbine via moving fluid whenever the impeller rotates faster than the turbine. Fluid coupling 14 may be a torque converter which also includes a stator which redirects the fluid when the impeller is rotating substantially faster than the impeller such that the turbine torque is a multiple of the impeller torque. Gearbox 18 includes gearing and shift elements configured to establish various power flow paths between turbine shaft 16 and output shaft 20. Each power flow path may be established by engaging a specified subset of the shift elements. At low vehicle speed, a power flow path providing torque multiplication and speed reduction between the turbine shaft and the output shaft may be established to optimize vehicle performance. At higher vehicle speeds, a power flow path providing speed multiplication may be established to minimize fuel consumption.

Most of the shift elements within gearbox 18 are engaged by supplying hydraulic fluid at an elevated pressure to a clutch apply chamber. (Gearbox 18 may also include passively engaged one-way clutches or electrically actuated elements.) Each shift element may include a clutch pack having friction plates splined to one component interleaved with separator plates splined to a different component. The fluid forces a piston to squeeze the clutch pack such that frictional force between the friction plates and the separator plates couples the components. The torque capacity of each shift element varies in proportion to changes in the fluid pressure. Pump 22, driven by input shaft 10, draws fluid from sump 24 and delivers it at an elevated pressure to valve body 26. Valve body 26 delivers the fluid to the clutch apply chambers at a pressure controlled in accordance with signals from powertrain controller 28. In addition to the fluid provided to clutch apply chambers, valve body provides fluid for lubrication and provides fluid to torque converter 14. The fluid eventually drains from gearbox 20 back to sump 24 at ambient pressure.

Powertrain controller 28 receives signals from a variety of sensors. Among these sensors are a Gear Shift Module (GSM) 30, a brake pedal 32 and an accelerator pedal 34 which are manipulated by a driver to indicate desired powertrain behavior. In addition to sending control signals to valve body 26, powertrain controller 28 also sends control signals to engine 10 and starter motor 36. When activated, starter motor 36 accelerates input shaft 10 to a speed at which combustion can be sustained in internal combustion engine 10. This is typically at least 250-300 rpm.

Figure 2:
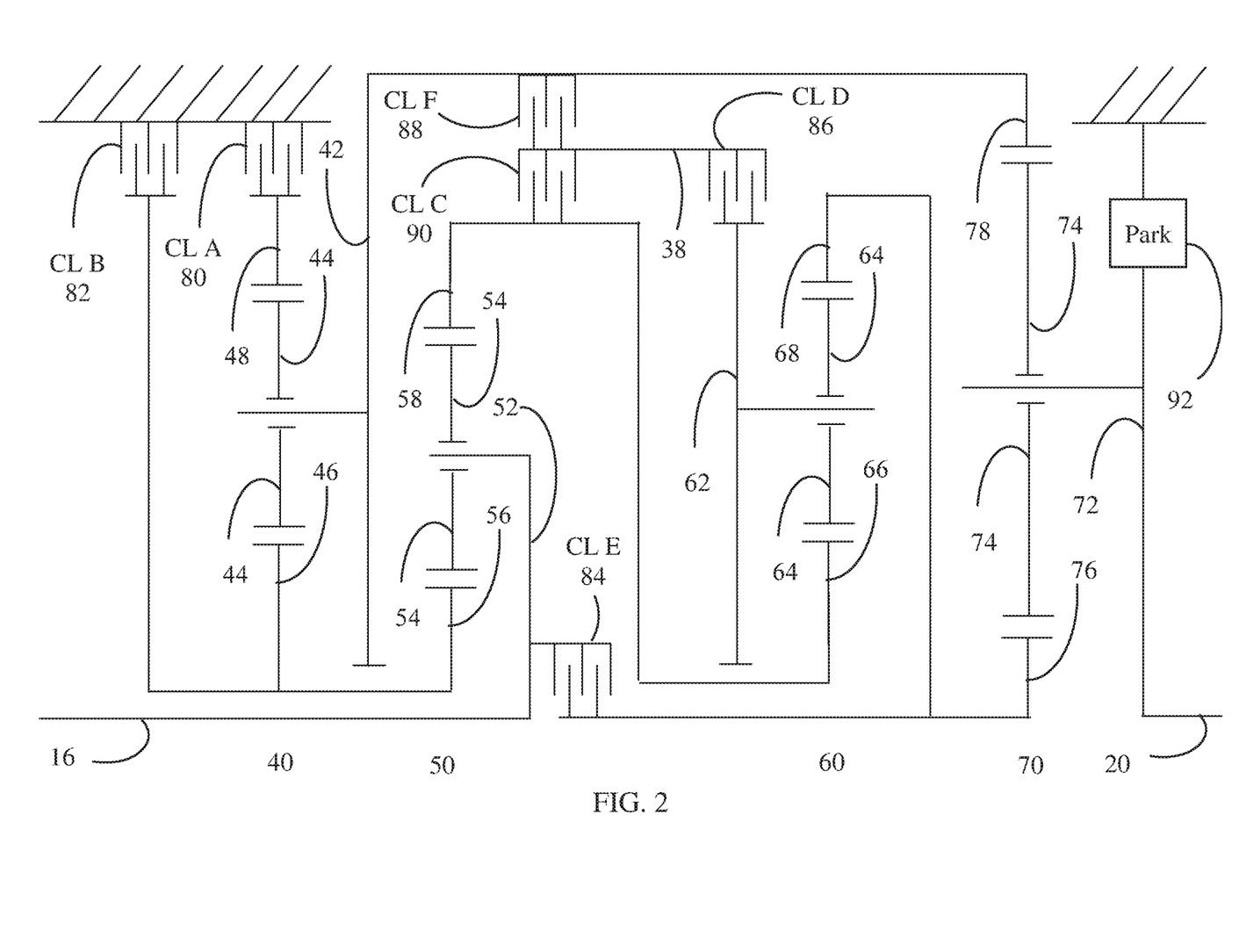
FIG. 2 is a schematic diagram of a transmission gearing arrangement suitable for the gearbox of the powertrain of FIG. 1.

An example transmission is schematically illustrated in FIG. 2. The transmission utilizes four simple planetary gear sets 40, 50, 60, and 70. Sun gear 46 is fixedly coupled to sun gear 56, carrier 42 is fixedly couple to ring gear 78, ring gear 58 is fixedly coupled to sun gear 66, ring gear 68 is fixedly coupled to sun gear 76, turbine shaft 16 is fixedly coupled to carrier 52, and output shaft 20 is fixedly coupled to carrier 72. Ring gear 48 is selectively held against rotation by brake 80 and sun gears 46 and 56 are selectively held against rotation by brake 82. Turbine shaft 16 is selectively coupled to ring gear 68 and sun gear 76 by clutch 84. Intermediate shaft 38 is selectively coupled to carrier 62 by clutch 86, selectively coupled to carrier 42 and ring gear 78 by clutch 88, and selectively coupled to ring gear 58 and sun gear 66 by clutch 90. A suggested ratio of gear teeth for each planetary gear set is listed in Table 1.

TABLE 1

| Ring 48/Sun 46 | 2.20 |
| Ring 58/Sun 56 | 1.75 |
| Ring 68/Sun 66 | 1.60 |
| Ring 78/Sun 76 | 3.70 |

As shown in Table 2, engaging the clutches and brakes in combinations of four establishes ten forward speed ratios and one reverse speed ratio between turbine shaft 16 and output shaft 20. An X indicates that the clutch is required to establish the speed ratio. An (X) indicates the clutch can be applied but is not required to establish the power flow path. In $1^{st}$ gear, either clutch 88 or clutch 90 can be applied instead of applying clutch 86 without changing the speed ratio. When the gear sets have tooth numbers as indicated in Table 1, the speed ratios have the values indicated in Table 2.

TABLE 2

| | A 80 | B 82 | C 90 | D 86 | E 84 | F 88 | Ratio | Step |
|---|---|---|---|---|---|---|---|---|
| Rev | X | X | | X | | X | −4.79 | 102% |
| Park | X | X | X | | | | | |
| $1^{st}$ | X | X | | (X) | X | | 4.70 | |
| $2^{nd}$ | X | X | X | X | | | 2.99 | 1.57 |
| $3^{rd}$ | X | | X | X | X | | 2.18 | 1.37 |
| $4^{th}$ | X | | X | X | | X | 1.80 | 1.21 |
| $5^{th}$ | X | | X | | X | X | 1.54 | 1.17 |
| $6^{th}$ | X | | | X | X | X | 1.29 | 1.19 |
| $7^{th}$ | | | X | X | X | X | 1.00 | 1.29 |
| $8^{th}$ | | X | | X | X | X | 0.85 | 1.17 |

TABLE 2-continued

| | A 80 | B 82 | C 90 | D 86 | E 84 | F 88 | Ratio | Step |
|---|---|---|---|---|---|---|---|---|
| 9th | | X | X | | X | X | 0.69 | 1.24 |
| 10th | | | X | X | | X | 0.64 | 1.08 |

Parking pawl 92 selectively couples output shaft 20 to the transmission case to prevent vehicle movement when the vehicle is parked. Unlike shift elements 80-90, parking pawl 92 is designed to remain engaged without any external power once engaged.

Figure 3:
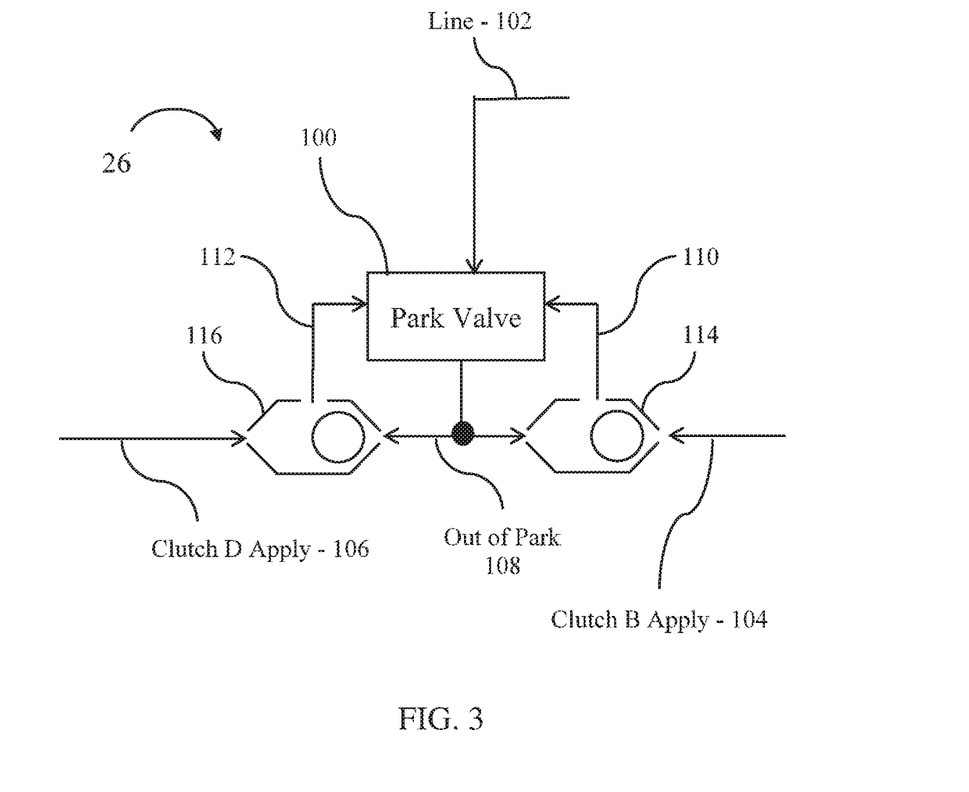
FIG. 3 is a schematic diagram of a park subsystem of a hydraulic control system for the transmission of FIG. 1.

FIG. 3 schematically illustrates the park control subsystem of valve body 26. A spool of park valve 100 is mechanically linked to the park mechanism 92, such that movement of the spool in one direction engages the park mechanism and movement in the opposite direction disengages the park mechanism. The structure of park valve 100 is described in more detail below. A spring within the park mechanism biases the system toward engagement. Also, pressure in the line pressure circuit 102 acts on an area of the spool to bias the system toward park engagement. The hydraulic control system also includes a set of clutch apply circuits that are routed to the apply chambers of each of the hydraulically controlled shift elements. The pressures of fluid in the clutch apply circuits are controlled to levels between zero and the pressure in the line pressure circuit 102. These clutch apply circuits include circuits 104 and 106 that engage shift elements B and D respectively. Park valve 100 fluidly connects an out-of-park circuit 108 to the line pressure circuit 102 when park is disengaged and vents out-of-park circuit 108 when park is engaged. Hydraulic circuits 110 and 112 bias the park valve toward the disengaged position. Check valve 114 fluidly connects circuit 110 to either clutch B apply circuit 104 or out-of-park circuit 108, whichever has the higher pressure. Similarly, check valve 116 fluidly connects circuit 112 to either clutch D apply circuit 106 or out-of-park circuit 108, whichever has the higher pressure.

When the park mechanism is engaged, both the park mechanism itself and pressure in line pressure circuit 102 tend to hold park valve 100 in the engaged position. To disengage the park mechanism, clutches B and D are engaged by commanding full pressure to apply circuits 104 and 106. Check valves 114 and 116 fluidly connect these clutch apply circuits to circuits 110 and 112 respectively. Pressure in circuits 110 and 112 force the park valve into the disengaged position. (The total area upon which circuits 110 and 112 act is greater than the area on which line pressure circuit 102 acts.) Once in the disengaged position, park valve 100 fluidly connects out-of-park circuit 108 to line pressure circuit 102. As a result, the park valve tends to stay in the disengaged position even if clutches B and D are later released. To re-engage the park mechanism, the pressure in line pressure circuit 102 is reduced to a level at which the park mechanism spring forces the park valve to the engaged position.

Figure 4:
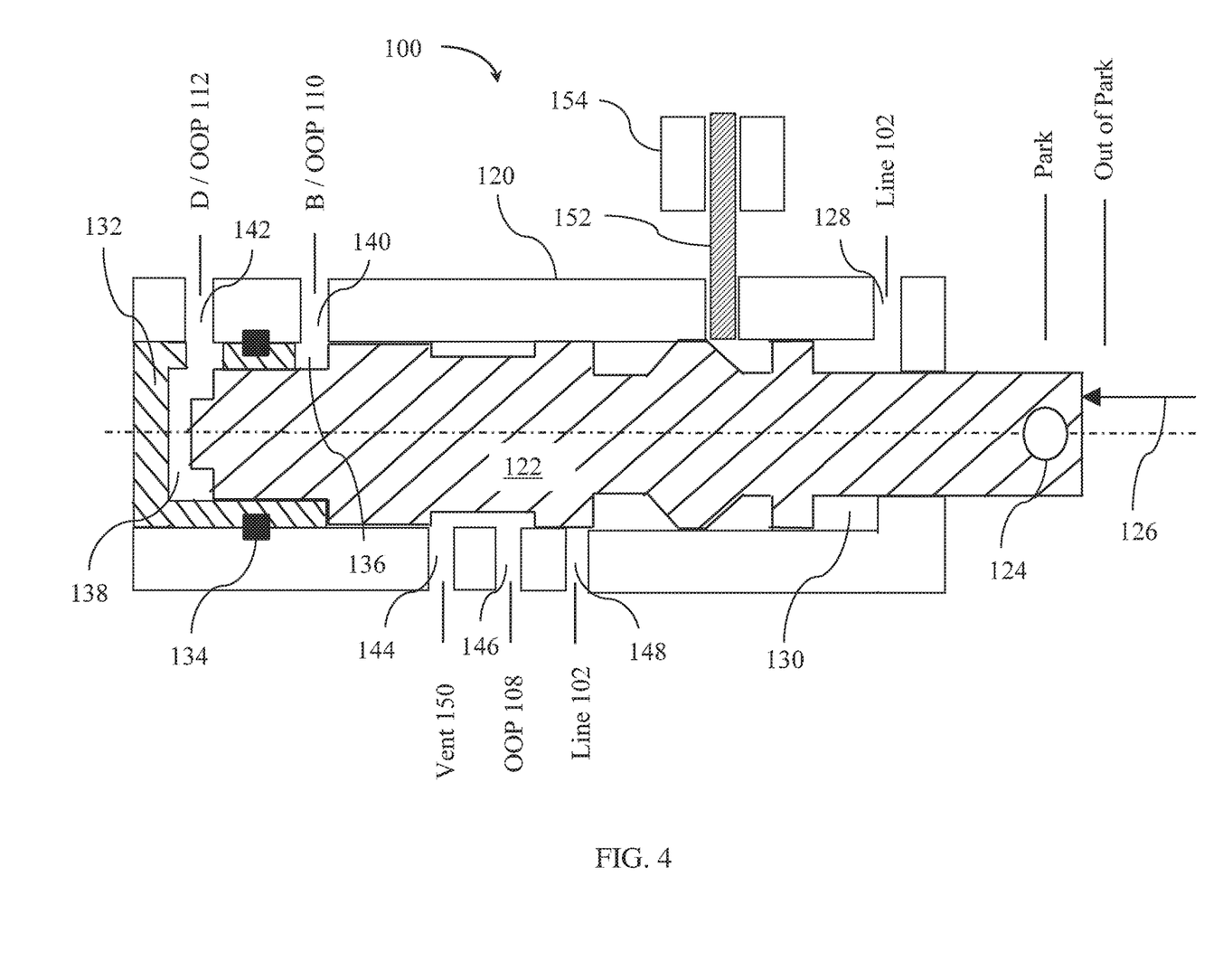
FIG. 4 is a cross section of a park valve assembly of the park subsystem of FIG. 3 in a position corresponding to park engaged.

FIG. 4 shows a cross section of park valve 100 in the position corresponding to Park. The valve includes a housing 120 with a bore and several ports. Spool 122 slides within the bore. Spool 122 is mechanically linked to the park mechanism via a feature such as hole 124. The park mechanism includes a spring that applies a return force 126 on spool 122 tending to push it to the left (pawl engaged position). Line pressure circuit 102 is connected to port 128 to provide fluid to chamber 130. Pressure in chamber 130 biases spool 122 toward the left, tending to hold the park mechanism in the engaged position.

End cap 132 is held in position relative to housing 120 by retaining clip 134. End cap 132, housing 120, and spool 122 cooperate to define chambers 136 and 138. Circuits 110 and 112 are connected to ports 140 and 142 respectively to provide fluid to chambers 136 and 138 respectively. Fluid pressure in these chambers act on separate areas of spool 122, biasing spool 122 toward the right. Ports 144, 146, and 148 are connected to vent 150, out-of-park circuit 108, and line pressure circuit 102 respectively. When spool 122 is in the position shown in FIG. 4, it fluidly connects ports 144 and 146 to such that the pressure in out-of-park circuit 108 is approximately equal to ambient pressure.

Holding pin 152 is shown in a retracted position in which it does not engage spool 122. Pin 152 may be biased toward this position by a spring or other force. When current is supplied to solenoid 154, it applies a magnetic force to pin 152 pushing it into engagement with spool 122. Once engaged with spool 122, holding pin 152 tends to hold the spool in its present position against hydraulic and other forces that would otherwise cause the spool to transition to the opposite position. The portion of the spool 122 that engages with the holding pin is sloped such that the pin could be forced back to the neutral position, if necessary, by applying stronger than usual hydraulic forces.

Figure 5:
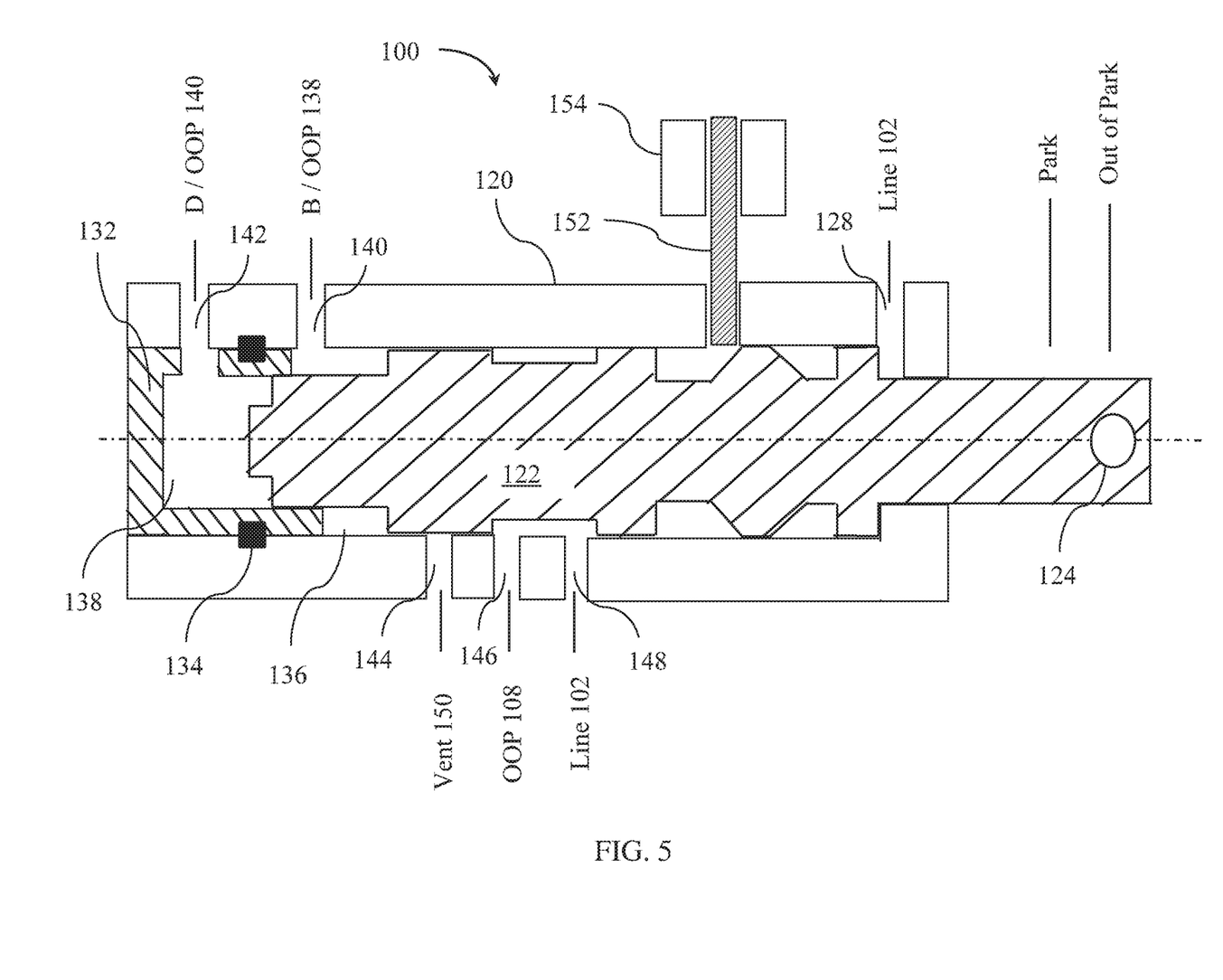
FIG. 5 is a cross section of a park valve assembly of the park subsystem of FIG. 3 in a position corresponding to park disengaged.

FIG. 5 shows a cross section of park valve 100 in the position corresponding to Drive, Reverse, or Neutral. The valve is moved from the position of FIG. 4 to the position of FIG. 4 by engaging shift elements B and D. The clutch apply pressure of these shift elements act on a larger area on the left side of spool 122 than what line pressure acts on the right side of spool 122, causing a net rightward force. When the line pressure is sufficiently high, this net force overcomes the force of the park mechanism return spring, pushing spool 122 to the position shown in FIG. 5 and disengaging the parking pawl.

With spool 122 in this position, port 146 is fluidly connected to port 148 such that line pressure circuit 102 is fluidly connected to out-of-park circuit 108. Due to the behavior of check valves 114 and 116, line pressure will continue to be supplied to ports 140 and 142 even if shift elements B and D are later released. To re-engage park, line pressure is reduced while shift elements B and D are disengaged.

Figure 6:
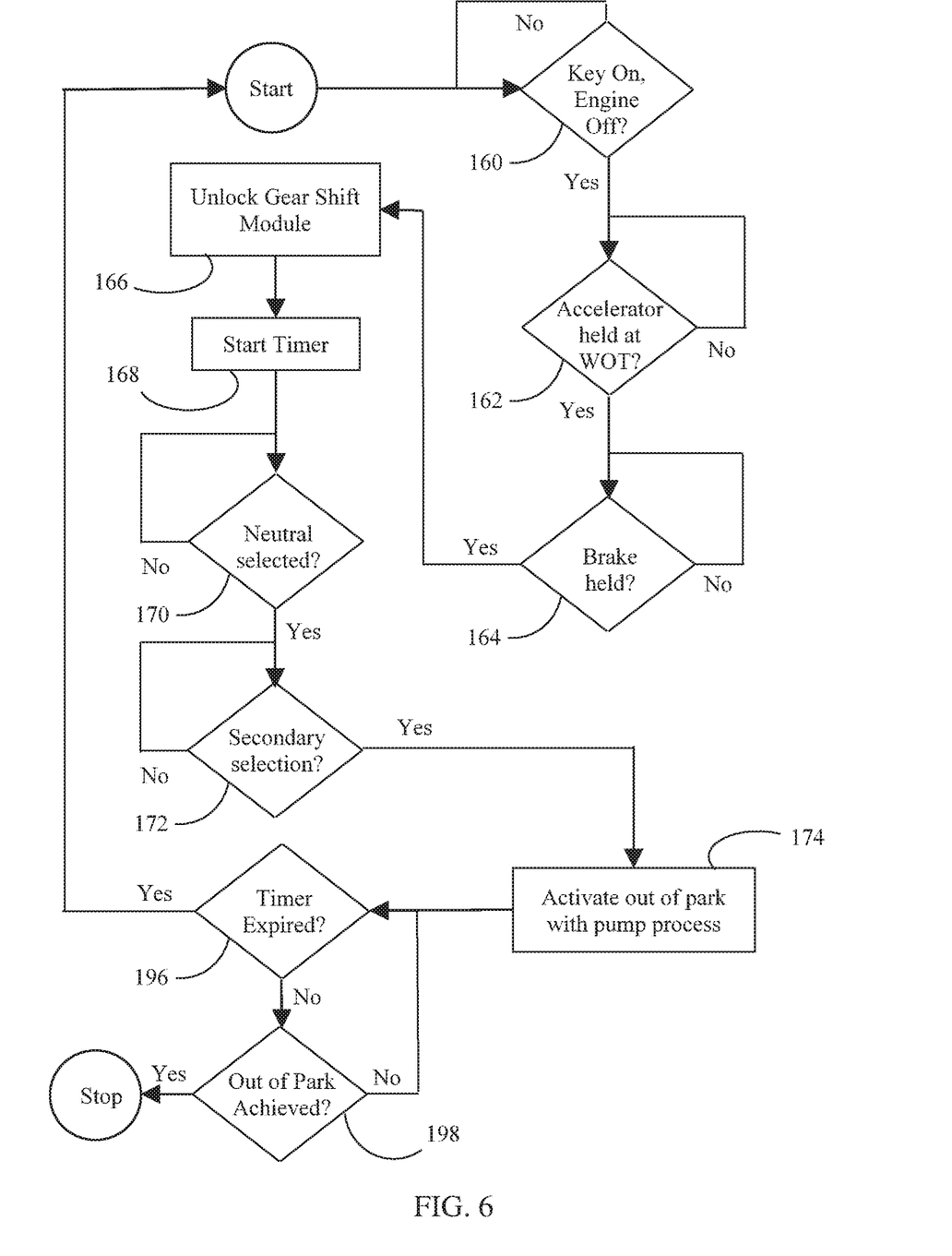
FIG. 6 is a flowchart for a user-interface process for a method of disengaging the park subsystem of the powertrain of FIG. 1 without starting the engine.
Figure 7:
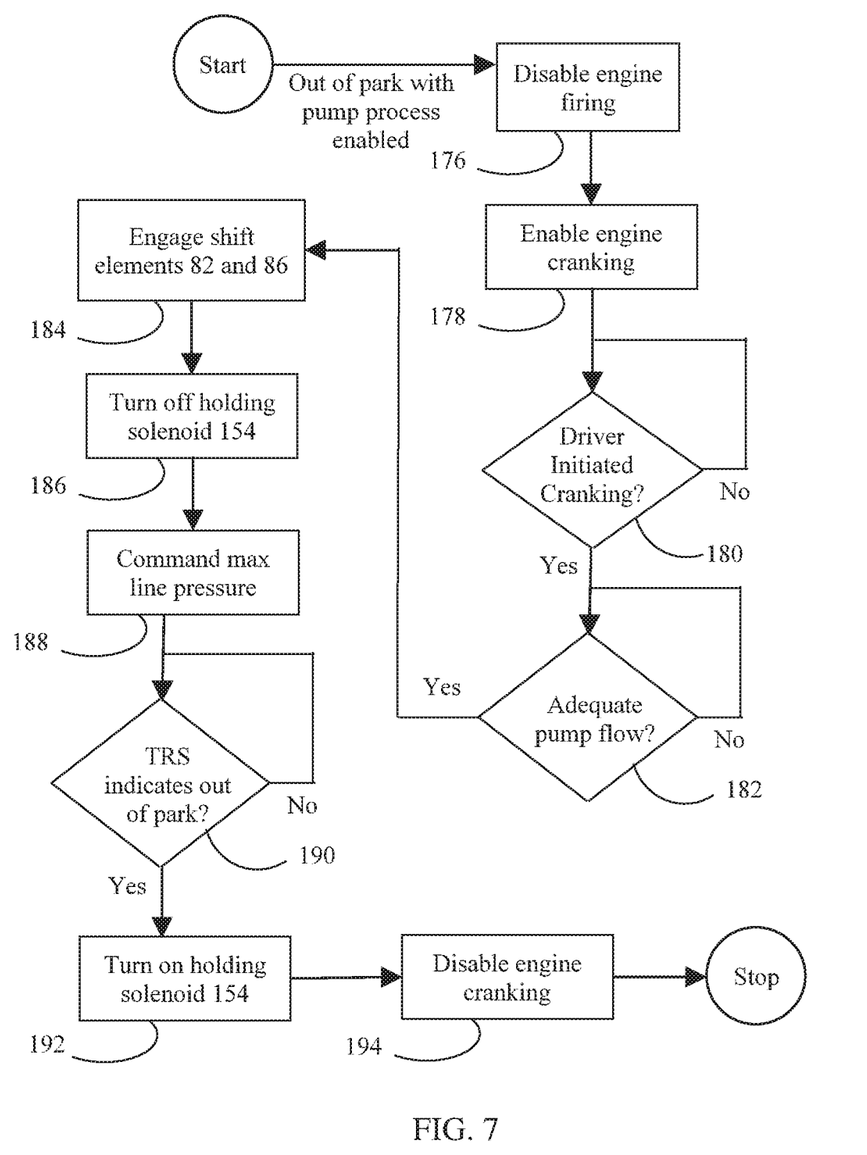
FIG. 7 is a flowchart for a transmission control process for a method of disengaging the park subsystem of the powertrain of FIG. 1 without starting the engine.

Under normal operating conditions, the engine will be running anytime that the driver commands disengagement of Park. However, there are some circumstances in which disengaging Park without starting the engine is advantageous. For example, when an engine malfunction precludes starting the engine, it may be necessary to disengage Park in order to load the vehicle on a tow truck. FIGS. 6 and 7 illustrate a method of disengaging Park without starting the engine. FIG. 6 illustrates the steps in the process that are related to the driver interface. These steps are selected such that inadvertent use of the process is highly unlikely. FIG. 7 illustrates the steps taken by controller to effectuate the driver's commands. The processes illustrated in these two flowcharts would operate cooperatively in parallel.

Referring to FIG. 6, the controller checks at 160 whether the key is in the on position with the engine not running. If not, the controller waits for this condition to be true. At 162, the controller check whether accelerator pedal 34 is fully depressed (otherwise known as the Wide Open Throttle (WOT) position). If not, the controller waits for this condition to be true. At 164, the controller waits for the brake pedal to be held. Once these conditions are satisfied, the controller unlocks gear shift module 30 at 166. Ordinarily, as a safety feature, gear shift module 30 is locked when the engine is not running in order to prevent disengaging Park when the vehicle is not ready to drive. Unlocking it in this condition over-rides this feature. At 168 a timer is started. As discussed later, this is part of resetting the process if it is not completed in a reasonable amount of time to avoid leaving the vehicle in an unsafe condition if the process is interrupted. At 170, the controller waits for the driver to select neutral via gear shift module. At 172, the controller waits for the driver to make a secondary gear shift module selection. The specific type of secondary selection depends upon the type of gear shift module installed. For example, if the vehicle has a rotary shifter dial or a shift lever, the secondary selection may be selecting a manual shift mode or a low mode. If the vehicle is equipped with a push button gear shift selector, the secondary selection may be pushing the neutral button a second time. After receiving the secondary selection, the controller activates the out of park with pump process at 174.

Referring to FIG. 7, the controller begins the out of park with pump process by disabling engine firing at 176 and enabling engine cranking at 178. The controller waits at 180 for the driver to initiate cranking. (Control of starter motor 36 in response to the driver action is handled by a different control routing operating in parallel with this routine.) Then, the controller waits at 182 until adequate pump flow is available. This is determined by measuring input shaft speed. Once adequate flow is available the controller engages shift elements 82 and 86 at 184, turns off holding solenoid 154 at 186, and commands maximum line pressure at 188. As described earlier, these actions should result in spool 122 of park valve 100 moving to the out of park position of FIG. 5. Since finite time is required for the spool to move, the controller waits at 190 for confirmation from the Transmission Range Sensor (TRS). Once the TRS confirms that the spool is in the out of park position, the controller turns on holding solenoid 154. This ensures that the transmission will stay out of Park after the starter motor stops cranking. At 194, the controller disables engine cranking.

Referring back to FIG. 6, after the controller activates the out of park with pump process at 174, it alternately checks whether the timer has expired at 196 and whether out of park is achieved at 198. The next action depends upon which of these happens first. If out of park is achieved first, the process stops successfully. If the timer expires before out of park is achieved, the process starts over.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A vehicle comprising:
    an engine having a crankshaft;
    a starter configured to rotate the crankshaft;
    a transmission having a pump driven by the crankshaft and a hydraulically actuated park mechanism; and
    a controller programmed to,
        in response to a sequence of driver actions, enable engine cranking, disable engine firing, and issue hydraulic commands, and
        in response to an engine cranking command, activate the starter to release the park mechanism without starting the engine.

2. The vehicle of claim 1 wherein the sequence of driver action comprises:
    depressing brake and accelerator pedals;
    selecting neutral; and
    performing a secondary selection.

3. The vehicle of claim 2 further comprising a push button gear shift selector, wherein the secondary selection comprises pushing a neutral button a second time.

4. The vehicle of claim 2 wherein the secondary selection comprises selecting a manual shift mode.

5. The vehicle of claim 2 wherein the secondary selection comprises selecting a low mode.

6. The vehicle of claim 1 wherein the hydraulic commands comprise:
    commanding a line pressure; and
    commanding engagement of two shift elements.

7. The vehicle of claim 1 wherein the controller is further programmed to:
    in response to the engine cranking command, turn off a holding solenoid; and
    in response to release of the park mechanism, turn on the holding solenoid.

8. A method to release a hydraulically actuated park mechanism, the method comprising:
    in response to depression of brake and accelerator pedals, unlocking a gear shift module;
    in response to selection of neutral followed by a secondary selection, disabling engine firing and enabling engine cranking; and
    in response to a driver initiated cranking command, activating a starter motor and issuing hydraulic commands to release the park mechanism without starting an engine.

9. The method of claim 8 wherein the secondary selection comprises pushing a neutral button a second time.

10. The method of claim 8 wherein the secondary selection comprises selecting a manual shift mode.

11. The method of claim 8 wherein the secondary selection comprises selecting a low mode.

12. The method of claim 8 wherein the hydraulic commands comprise:
    commanding a line pressure; and
    commanding engagement of two shift elements.

13. The method of claim 8 further comprising:
    in response to the driver initiated cranking command, turning off a holding solenoid; and
    in response to release of the park mechanism, turning on the holding solenoid.

14. A vehicle comprising:
    a starter and a pump drivably connected to an engine crankshaft;
    a hydraulically actuated parking mechanism; and a controller programmed to,
- in response to depression of brake and accelerator pedals, unlock a gear shift module, and
- in response to selection of neutral and a secondary selection, enable engine cranking, disable engine firing, and issue hydraulic commands such that activation of the starter releases the park mechanism without starting an engine.

15. The vehicle of claim 14 wherein the secondary selection comprises pushing a neutral button a second time.

16. The vehicle of claim 14 wherein the secondary selection comprises selecting a manual shift mode.

17. The vehicle of claim 14 wherein the secondary selection comprises selecting a low mode.

18. The vehicle of claim 14 wherein the hydraulic commands comprise:
- commanding a line pressure; and
- commanding engagement of two shift elements.

19. The vehicle of claim 14 wherein the controller is further programmed to:
- in response to starter motor activation, turn off a holding solenoid; and
- in response to release of the park mechanism, turn on the holding solenoid.

* * * * *